(No Model.)
W. R. WILBOURN.
SIDE SADDLE TREE.
No. 270,269. Patented Jan. 9, 1883.
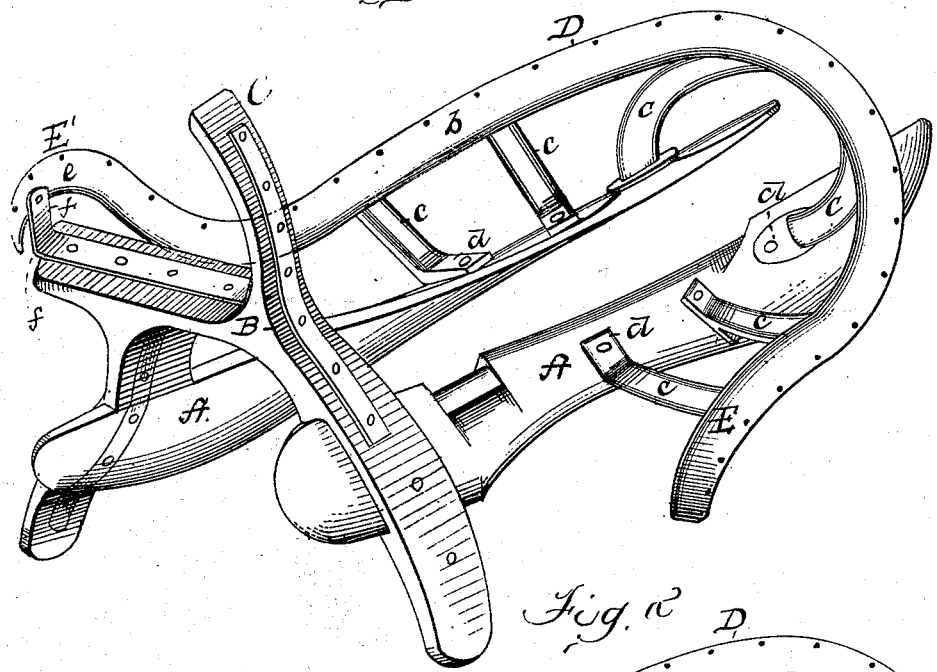
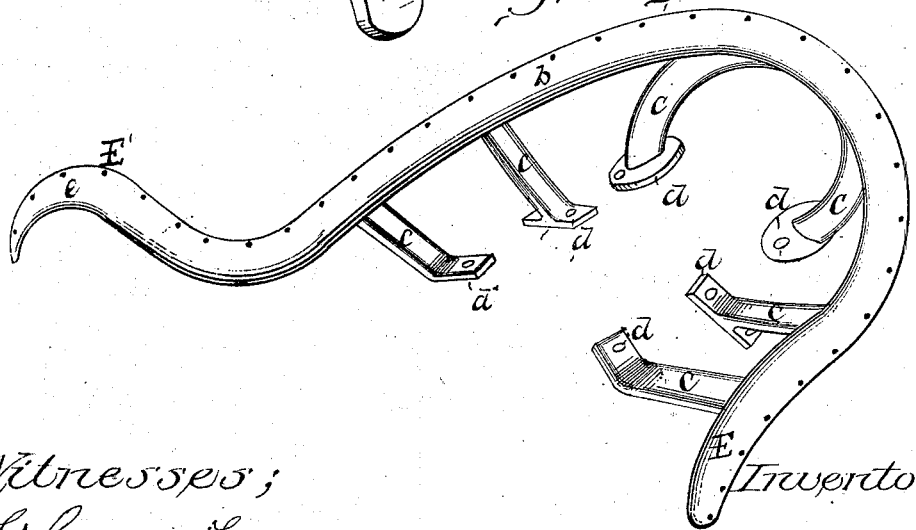
Witnesses:
␣␣Walter Fowler,
␣␣J. Heyman
Inventor:
␣␣W. R. Wilbourn
by Heyman & Kane,
␣␣␣␣Attorneys.

UNITED STATES PATENT OFFICE.

WILLIAM R. WILBOURN, OF LEXINGTON, VIRGINIA.

SIDE-SADDLE TREE.

SPECIFICATION forming part of Letters Patent No. 270,269, dated January 9, 1883.

Application filed November 6, 1882. (No model.)

*To all whom it may concern:*

Be it known that I, WILLIAM R. WILBOURN, a citizen of the United States of America, residing at Lexington, in the county of Rockbridge and State of Virginia, have invented certain new and useful Improvements in Side-Saddle Trees; and I do hereby declare the following to be a full, clear, and exact description of the invention, such as will enable others skilled in the art to which it appertains to make and use the same.

This invention relates to a saddle-tree for side-saddles; and it has for its object to form a more perfect and comfortable seat for the rider.

My invention consists, in combination with the side bars, arch, and near horn, of an elevated cantle formed at one side with an extension, which is curved outwardly and downward toward the front to form a thigh support or rest, as will be hereinafter more fully described.

My invention further consists in the novel construction of a cantle for a side-saddle, as will be hereinafter more fully set forth and specifically claimed.

In the accompanying drawings, Figure 1 is a perspective view of my improved side-saddle tree, and Fig. 2 is a perspective view of the cantle.

In the annexed drawings, the letter A represents the two side bars, and B the arch, provided with the near horn C, suitably connected and braced for the necessary strength and firmness.

The letter D indicates the cantle for a lady rider, composed of the rim $b$ and the standards $c$, with perforated feet or bases $d$ for attaching the cantle to the side bars by screws or other fastening means. The off or front end of the cantle is curved upward, forward, and downward at $e$, and is attached between the outer ends of the metallic straps $f$, as shown, to form the off horn E'. The other end of the cantle is curved outwardly, downwardly, and rearwardly, as shown, to form a support or rest E for the left thigh of the rider.

The seat of the saddle should extend downward, so as to cover the support E, and then extend across to the near arch-piece, where a connection is made to make a continuation of the seat and form a small skirt.

A cantle of the construction shown forms a concave seat-surface which conforms nicely to the shape of the rider, and the side extension serves to retain her more securely in the saddle, thereby enabling the rider to seat herself in the saddle more erect and firmer with increased comfort; also, this side extension for the support of the left thigh equalizes the pressure on the horse's back.

The cantle is preferably made of wrought-iron, although other material may be employed.

What I claim as my invention, and desire to secure by Letters Patent, is—

1. In a side-saddle tree, the combination, with side bars and arch provided with a near horn, of a cantle formed at one end with a horn and the other end curved outwardly, downward, and rearwardly, forming a thigh-support, substantially as described.

2. A cantle for a side-saddle tree having its front end curved upward and forward to form a horn and its rear end curved outward and downward to form a thigh-support, and adapted to be supported upon side bars of the saddle-tree, substantially as described.

In testimony whereof I affix my signature in presence of two witnesses.

WM. R. WILBOURN.

Witnesses:
J. M. YZNAGA,
D. D. KANE.